United States Patent
Kozek et al.

(10) Patent No.: US 8,737,524 B2
(45) Date of Patent: May 27, 2014

(54) METHOD AND DEVICE FOR REDUCING THE TRANSMISSION POWER ON A DIGITAL SUBSCRIBER LINE

(75) Inventors: Werner Kozek, Vienna (AT); Michael Siegert, Markt Schwaben (DE)

(73) Assignee: Adtran GmbH, Berlin-Siemensstadt (DE)

( * ) Notice: Subject to any disclaimer, the term of this patent is extended or adjusted under 35 U.S.C. 154(b) by 537 days.

(21) Appl. No.: 13/056,666

(22) PCT Filed: Jul. 28, 2009

(86) PCT No.: PCT/EP2009/059712
§ 371 (c)(1),
(2), (4) Date: Mar. 30, 2011

(87) PCT Pub. No.: WO2010/012711
PCT Pub. Date: Feb. 4, 2010

(65) Prior Publication Data
US 2011/0188554 A1 Aug. 4, 2011

(30) Foreign Application Priority Data
Jul. 29, 2008 (EP) .................... 08104910

(51) Int. Cl.
*H04L 25/49* (2006.01)

(52) U.S. Cl.
USPC ........................................ 375/296

(58) Field of Classification Search
USPC ......... 375/222, 224, 213, 214, 225, 226, 278, 375/296
See application file for complete search history.

(56) References Cited

U.S. PATENT DOCUMENTS 7,133,443 B2 * 11/2006 Taunton .................. 375/222
7,782,889 B2   8/2010 Kozek et al.
2005/0141410 A1   6/2005 Zhang et al.
2006/0120269 A1   6/2006 Kim et al.

FOREIGN PATENT DOCUMENTS

CN         101043281 A    9/2007
WO       2005034459 A1    4/2005

OTHER PUBLICATIONS

Muta et al., "A Peak Power Reduction Scheme Based on Reversal of Parity-bits for a Block-coded OFDM Signal" Vehicular Technology Conference, 2004. VTC-2004-Spring. 2004 IEEE 59th Milan, Italy—May 17-19, 2004, Piscataway, NJ, USA, IEEE, US, vol. 4, May 17, 2004, pp. 1911-1915, XP010766494.
ITU-993.2—ITU-T Recomendation G.993.2, Very high speed digital subscriber line transceivers 2 (VDSL2), International Telecommunications Union, Geneva, Feb. 2006.
ITU-992.3—ITU-T Recomendation G.992.3, Asymetric digital subcriber line transceivers 2 (ADSL2), Jan. 2005.
TU-992.5—ITU-T Recomendation G.992.5, Asymetric digital subcriber line transceivers—Extended bandwith ADSL2 (ADSL2+), Jan. 2005.
IEEE Std 802.3-2002, Part 3: Carrier sense multiple access with collision detection (CSMA/CD) acess method and physical layer specifications, Standard IEEE 802.3 (2002), Institute of Electrical and Electronics Engineers, New York, Mar. 2002.

* cited by examiner

*Primary Examiner* — Kevin Kim
(74) *Attorney, Agent, or Firm* — Laurence A. Greenberg; Werner H. Stemer; Ralph E. Locher

(57) ABSTRACT

A method and a device for data processing are provided, said method comprising the steps of (a) at least one bit of the data is manipulated (405); (b) it is checked whether the manipulation is admissible (406); and (c) if the manipulation is admissible, the manipulated data is transmitted (409). Furthermore, a communication system is suggested comprising said device.

23 Claims, 4 Drawing Sheets

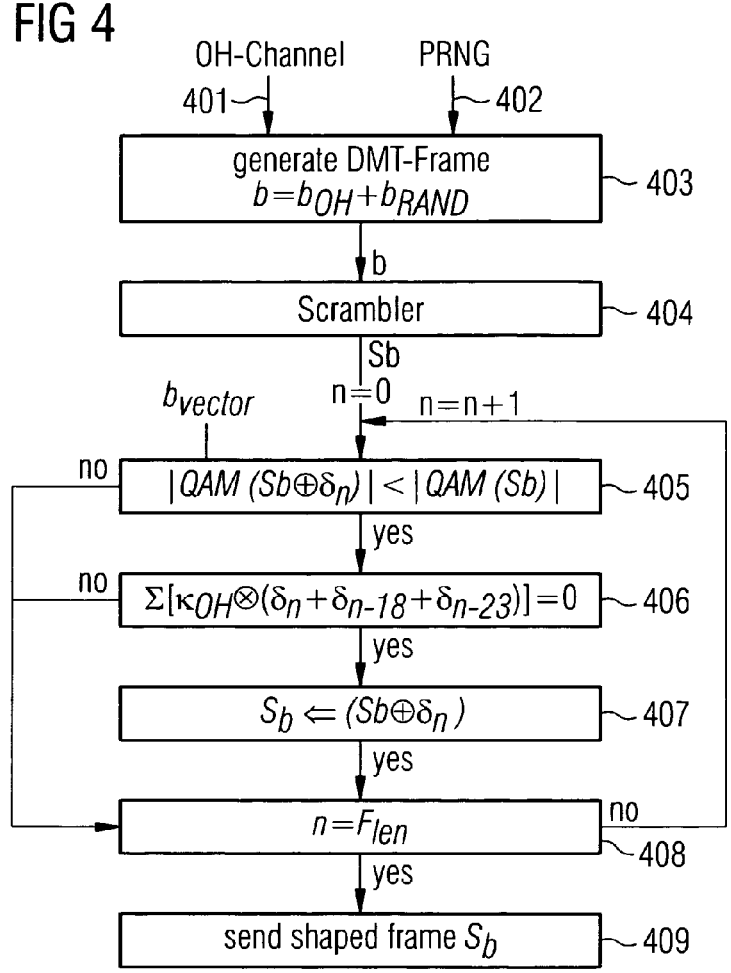

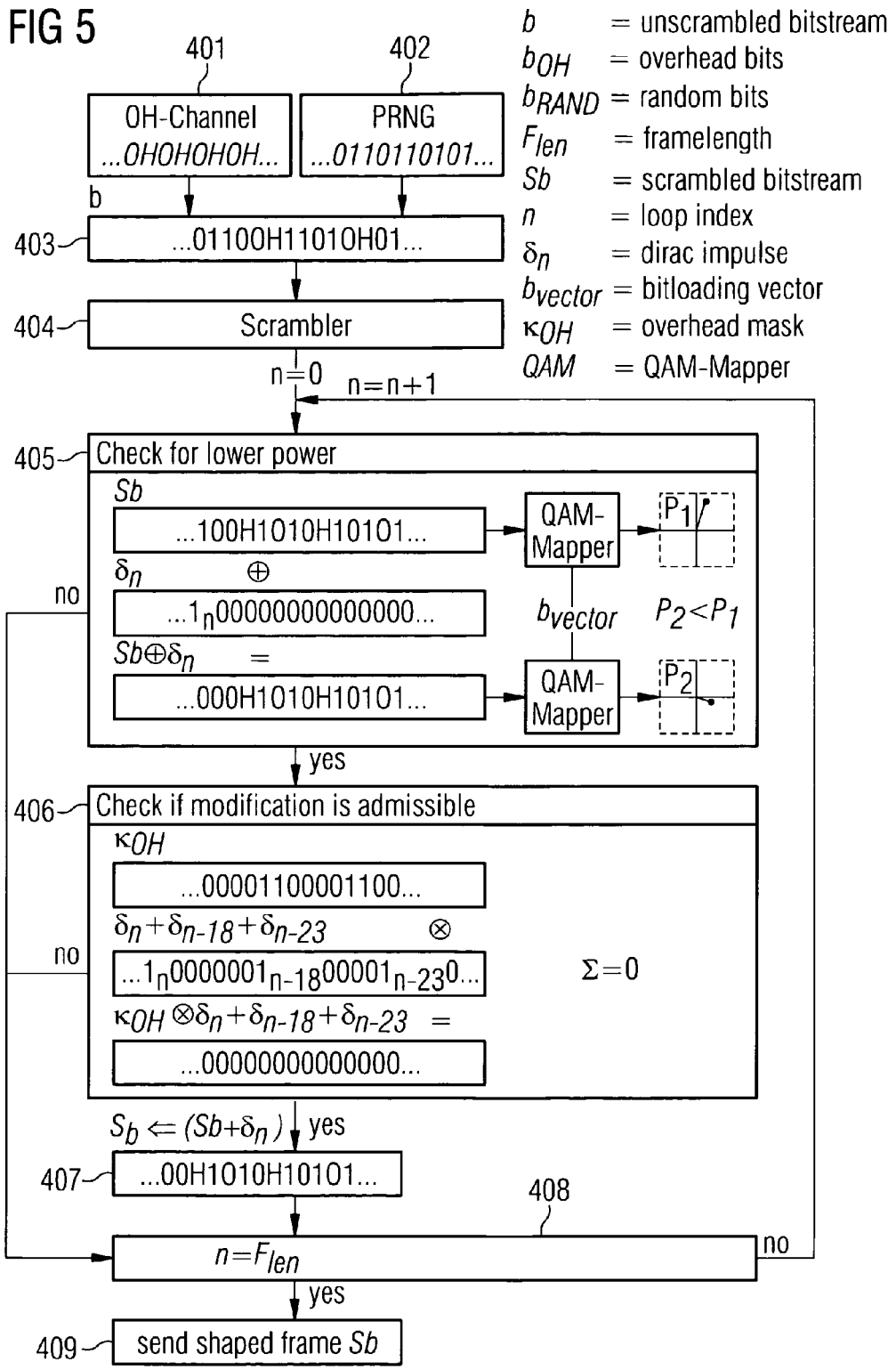

METHOD AND DEVICE FOR REDUCING THE TRANSMISSION POWER ON A DIGITAL SUBSCRIBER LINE

BACKGROUND OF THE INVENTION

Field of the Invention

The invention relates to a method and to a device for data processing and to a communication system comprising such a device.

The evolution of DSL technology is characterized by achieving higher bit-rates by broadening of the transmission bandwidth. Since both loop attenuation and crosstalk are increasing with frequency more sophisticated measures are necessary to be provided at the DSL transmitter and the DSL receiver.

Currently deployed VDSL2 systems already use bandwidth up to 17 Mhz, while the ITU-993.2 standard suggests a bandwidth of up to 30 Mhz. A typical target bit rate of, e.g., 100 Mbit/sec (amounting to a bidirectional net data rate of 200 Mbit/sec) at a loop length of 0.8 km to 1 km cannot be achieved by current transceiver technology. Crosstalk reduction leads to an increase of reach (maximum admissible loop length at a given rate) or an increase of data rate (at given loop length) or it may result in an increased stability of a "living loop plant" situation (i.e. CPEs turned off and on causing fluctuating crosstalk).

In terms of cost required for implementation, approaches to efficiently reduce crosstalk also decrease transmission power that is the basis for any interference. An example is the so-called power back-off (according to ITU-993.2 standardized for VDSL2) which reduces a power of a user with relatively short loop length in a temporally stationary way. Another possibility of reducing an average (transmission) power is avoiding the transmission of idle bits (i.e. avoiding a status quo that maintains a bit rate over the DSL link even when no actual user data is transmitted—"leased line philosophy"). Such a low power mode is standardized in the context of ADSL2/ADSL2+, referred to as a "L2-mode", which is based upon a handshake-based negotiation between a transmitter and a receiver (according to ITU-992.3 and ITU-992.5). Such handshake-based procedure is relatively slow and may lead to interoperability issues. In addition, operators and service providers believe in problems due to fluctuating crosstalk.

According to WO 2005/034459 frequent changes in transmission power enable non-coherent crosstalk estimation methods. However, a central management entity may register changes in the transmit power as well as changes in a receiver's signal-to-noise-ratio (SNR). A binary correlation analysis may provide a non-coherent (in particular regarding a magnitude) information about crosstalk-couplings between different DSL ports.

FIG. 1 shows a traffic simulation assuming three high-definition IPTV channels providing a stationary floor of about 40 Mbit/sec and typical bursts of IP traffic resulting from web browsing applications with peak data rates of more than 100 Mbit/sec.

BRIEF SUMMARY OF THE INVENTION

The problem to be solved is to overcome the disadvantages mentioned above and in particular to provide an efficient approach of saving cost and energy in particular in a DSL environment.

This problem is solved according to the features of the independent claims. Further embodiments result from the depending claims.

In order to overcome this problem, a method is provided for data processing via a digital subscriber line comprising the steps:

(a) at least one bit of the data is manipulated;
(b) it is checked whether the manipulation is admissible;
(c) if the manipulation is admissible, the manipulated data is transmitted.

It is noted that digital subscriber line applies to all existing and upcoming technologies standards, comprising, e.g., xDSLn, wherein x stands for "A", "V", and n may be "1", "2", "2+", etc.

The approach provided allows for an efficient bit manipulation of a data stream to be transmitted in a way that it requires a reduced amount of energy. This concept is in particular applicable with a leased line philosophy that conveys idle data even in cases when no user data is to be transferred. Such idle data (or portions thereof) are manipulated in a way that they require less energy to be transmitted. Another advantage of this approach is that such manipulated data inflicts less crosstalk thereby allowing a higher bitrate (or less power provided) for data that actual carries user information.

It is noted that at a particular transmission stage, the bits may arrive in a scrambled fashion. The processing unit that copes with such sequence of "0" and "1" may be not aware of which "0" and "1" belongs to idle data, user data or (useful) overhead data. Hence, the approach suggested manipulates at least a portion of such data (preferably on a bit-by-bit level in an iterative manner) and further assesses whether such change has a detrimental impact on the user data. If this is not the case, i.e. if the user data do not deteriorate (beyond a predetermined degree), the manipulation is deemed applicable and the manipulated data may be transferred or transmitted to a receiver.

In a multiuser scenario, bursts of IP traffic may be handled by statistically multiplexing means allowing for an aggregation ratio of up to 1:50 without any significant degradation of performance. It is an advantage of cross-layer-modulation (CLM) to exploit this multiplexing gain due to the bursty IP traffic. In addition, high rates of data traffic (peaks) enable powerful retransmission methods that allow dealing with an impulse noise problem, which is currently one of the obstacles of widespread IPTV adoption particularly for carriers with inhouse cabling of poor quality.

The approach provided is in particular applicable in low latency configurations (so-called "fast path" scenario without forward-error correction and interleaver), wherein any tone-ordering may be switched off. This prerequisite in particular fits into the "burst transmission" scenario rather than "leased line philosophy".

In an embodiment, steps (a) and (b) are repeatedly processed for a data frame, in particular for a DMT frame.

In another embodiment, after step (a) it is checked whether the manipulation leads to a reduced transmission power.

In a further embodiment, the at least one bit of the data is manipulated by flipping at least one bit's value.

In a next embodiment, in step (b) it is checked by a descrambler whether the manipulation of step (a) leads to bit errors regarding in particular payload data and/or necessary overhead data.

It is noted that a particular degree of error may be admissible as well (and may advantageously be corrected by error handling or error correction means).

It is also an embodiment that the descrambler comprises a reduced amount of taps compared to a scrambler.

Pursuant to another embodiment, in a step (d) the manipulation is not executed (as the manipulation is deemed inadmissible) and it is in particular branched to step (a).

According to an embodiment, prior to step (a) a scrambler provides said data to be processed.

Such data may in particular comprise overhead data, payload data and idle data. The amount of idle data may depend on the actual user traffic conveyed via the line(s).

According to another embodiment, a bit mask is applied at the scrambler's input. It may be checked whether the manipulation is admissible by checking whether the manipulated at least one bit of data does not fall into the bit mask.

In yet another embodiment, manipulated data is transmitted in upstream and/or in downstream direction.

According to a next embodiment, the method is provided or associated with a transmitting stage in a central office and/or a digital subscriber line access multiplexer and/or a customer premises equipment.

Pursuant to yet an embodiment, a transmitter conveys at least one adaptation signal to a receiver and the receiver adjusts its gain, in particular its gain control, based on said at least one adaptation signal such that subsequent user data are received substantially without error, in particular without clipping.

According to an embodiment, the receiver adjusts its gain, in particular its gain control, based on said at least one adaptation signal such that subsequent user data are received substantially without error, in particular without clipping.

Hence, the at least one adaptation signal is efficiently utilized to adjust the receiver's gain control, in particular a power of at least one amplifier at the receiver, to substantially avoid a clipping effect or any other kind of overamplification at the receiver.

There may be various adaptation signals and/or control strategies applicable to achieve such a result.

This approach is in particular of advantage if crosstalk and/or interference is/are reduced by transmitting special data as (low-power) idle data. Such special data may comprise QAM constellation signals with low power for several or all sub-carriers, i.e. signal constellation points near the zero point, so that the power spectral density (PSD) of the transmitted signal is small and thus leads to almost no crosstalk.

In an embodiment, the at least one adaptation signal comprises intermittent signals in a low power mode and/or intermittent signals in a high power mode.

Advantageously, this approach avoids the AGC from increasing its amplification because of short low power mode intervals. Preferably, the duration of such interval is set receiver specific, in particular vendor and/or CPE specific.

In another embodiment, the at least one adaptation signal comprises a training signal that is transmitted in advance to user data transmission, said training signal enabling the receiver to enter a normal mode of operation.

Advantageously, a time for the training signal to be provided may depend on the receiver-specific configuration (delay needed to re-enter normal mode of operation). Such delay may be determined by means of probing, e.g., the transmitter sending probing signals to the receiver and adjusting the delay based on the response signals of the receiver, in particular via a feedback channel.

It is a further embodiment that the at least one adaptation signal comprises intermittent signals in a low power mode and/or intermittent signals in a high power mode.

The problem stated above is also solved by a device comprising a and/or being associated with a processor unit and/or a hard-wired circuit and/or a logic device that is arranged such that the method as described herein is executable on said processor unit.

According to an embodiment, the device is a communication device, in particular a or being associated with a central office or digital subscriber line access multiplexer or a customer premises equipment.

The problem stated supra is further solved by a communication system comprising the device as described herein.

BRIEF DESCRIPTION OF THE SEVERAL VIEWS OF THE DRAWING

Embodiments of the invention are shown and illustrated in the following figures:

FIG. 4 shows a diagram comprising steps of a binary precoding scheme that can be efficiently applied to reduce either crosstalk and/or (transmission) power;

FIG. 5 shows a more detailed version of the binary precoding scheme according to FIG. 4.

DESCRIPTION OF THE INVENTION

The approach provided herein allows for cross-layer modulation-based rate-adaptive power reduction.

The principle of cross-layer modulation (CLM) can be summarized, e.g., as follows: A transmitter located at or associated with a central office (CO) sends idle cells (ATM) or idle frames (Ethernet). The data pattern is adapted to a specific bit loading vector and to a respective QAM mapping, i.e., bit combinations are selected that are close to the origin of the complex plane and thus require a reduced amount of power when being transmitted. Such bit combination may constitute or be part of "power shaping" packets.

User bits, bits with VDSL2 overhead information and certain parts of the Ethernet frame and/or ATM are preferably excluded from such power shaping in order to avoid additional bit errors. With user traffic decreasing, such "power shaping" packets can increasingly be inserted, which in turn leads to a significant power reduction.

The approach provided is applicable in upstream direction and/or in downstream direction.

Overhead bits may in particular comprise any mixture of payload and actual overhead information. CLM may preferably treat payload and actual overhead information in a same manner and may not distinguish between both.

Figure 1:
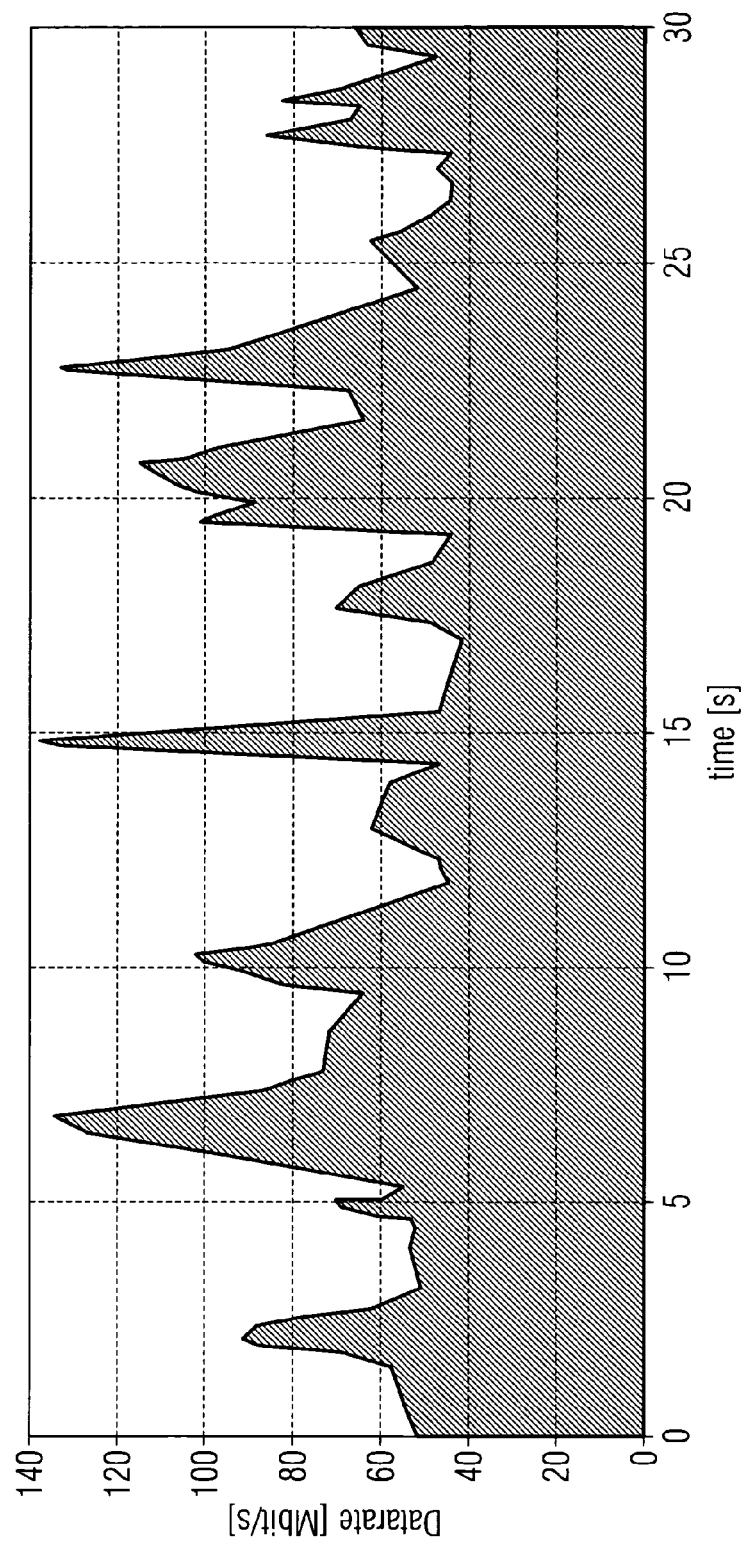
FIG. 1 shows a traffic simulation assuming three high-definition IPTV channels.
Figure 2:
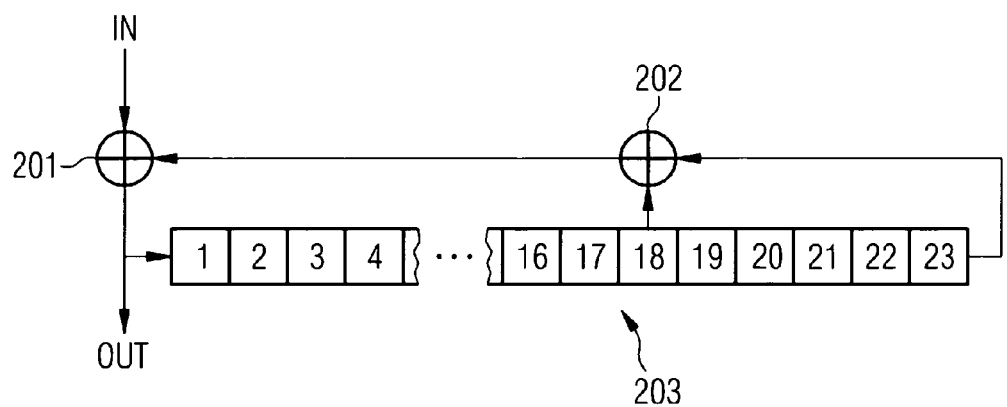
FIG. 2 shows a schematics of a scrambler.

FIG. 2 shows a scrambler schematics with an input IN fed to an XOR operator 201. An output OUT of the XOR operator 201 is connected to a shift register 203 comprising 23 stages, wherein stage 18 and 23 are combined by an XOR operator 202, which output is further fed to said XOR operator 201. The scrambler of FIG. 2 can be understood as a linear time-invariant system acting over a Galois field F2 having an impulse response of infinite length.

The approach presented herein overcomes a mixing effect of the scrambler by a fixed-length iterative coding procedure.

Figure 3:
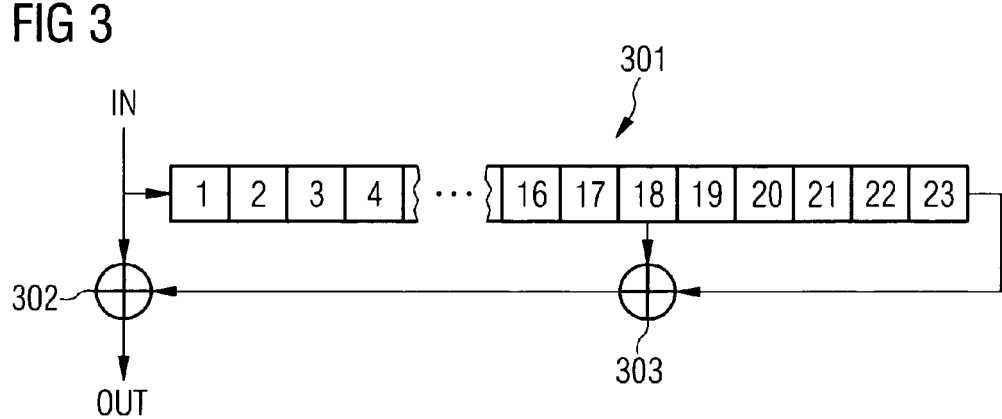
FIG. 3 shows a schematics of a descrambler for decoding data encoded by the scrambler according to FIG. 2.

FIG. 3 shows a descrambler schematics. An input IN is fed to a shift register 301 comprising 23 stages. The input IN is further connected to an XOR operator 302 which output provides an output signal OUT. Stage 18 and stage 23 of the shift register 301 are combined by an XOR operator 303. The output of said XOR operator 303 is fed to the XOR operator 302.

As VDSL2 uses an adaptive multicarrier QAM modulation in the sense that the number of bits modulated onto each carrier varies with the carrier index (bit numbers q admissible usually vary as follows: 1<q<15). A mapping between bits and complex numbers Q(b), i.e., for a given binary vector of varying length Q(b), is a complex number (out of a finite alphabet as set forth in ITU-992.3).

The approach is inserted preferably immediately before a scrambling stage at the transmitter side. Preferably, a complete bitloading vector for one DMT frame (in VDSL2 this may in a worst case scenario amount to a memory of 4 KByte) is buffered.

A bit mask is suggested for the overhead bits (at the scrambler's input):

$$\kappa_{OH}(k) = \begin{cases} 1, & \text{if bit with index for } k \text{ is overhead bit} \\ 0, & \text{if not.} \end{cases} \quad (1)$$

Hence, the (complete) bitloading vector is initialized with overhead bits and with random bits from a (e.g., fairly arbitrary) random number generator.

Preferably, each of the scrambled bits is then checked whether flipping the value of the n-th bit decreases the power level:

$$|Q(Sb+\delta_n)| < |Q(Sb)| \quad (2).$$

It is noted that such flipping of a bit can be summarized as adding a number "1" via binary field $F_2$ addition (corresponding to an exclusive-or (XOR) operation in computer algebra). $\delta(n)$ is referred to as the Kronecker delta, wherein $$\delta(n) = \begin{cases} 1, & \text{if } n = 0 \\ 0, & \text{if } n \neq 0. \end{cases}$$

If the condition (2) is true, it is checked whether changing this bit is admissible or not.

The descrambler may be provided with a limited (finite) memory having n impulse response as follows:

$$h(n)=\delta(n)+\delta(n-18)+\delta(n-23) \quad (3)$$

Hence, due to the scrambler's structure (see FIG. 2), flipping one bit at the scrambler's output may flip three bits the scrambler's input.

It is preferably checked whether these three bits affected do not fall into the bit mask for the overhead bits:

$$\kappa_{OH}(n)\cdot(\delta(n)+\delta(n-18)+\delta(n-23))=0 \forall n \quad (4).$$

If equation (2) and equation (4) are satisfied, the n-th bit can be flipped and such flipping results in a reduction of power.

After having processed these steps for the scrambled bitloading vector, the modified bits can be inserted to further processing stages, e.g., a mapper, a IFFT, etc. Then the steps can be applied to a subsequent DMT frame.

The steps of this approach are schematically summarized in FIG. 4 and in FIG. 5.

FIG. 4 shows a diagram comprising steps of a binary precoding scheme. Such precoding scheme can be efficiently applied to reduce either crosstalk and/or power.

An overhead channel 401 and a pseudo-random number generator (PRNG) 402 are both fed to a stage 403 which generates a DMT frame, i.e. an unscrambled bitstream b by combining overhead bits $b_{OH}$ and random bits $b_{RAND}$:

$$b=b_{OH}+b_{RAND} \quad (5).$$

The bitstream b is further fed to a scrambler 404 that produces a scrambled bitstream Sb and conveys it to a processing stage 405.

The processing stage 405 checks how the bitstream Sb may be modified to allow for a lower transmission power according to:

$$|QAM(Sb \oplus \delta_n)| < |QAM(Sb)| \quad (6),$$

wherein $\delta_n$ references a dirac impulse.

Prior to entering processing stage 405, a loop index n is set to 0. Furthermore, a bitloading vector $b_{vector}$ is provided.

If the condition according to equation (6) is true, a processing stage 406 is entered. The processing stage 406 checks whether the modification determined is admissible:

$$\Sigma[\kappa_{OH} \otimes (\delta_n+\delta_{n-18}+\delta_{n-23})]=0 \quad (7),$$

wherein $\kappa_{OH}$ states an overhead mask.

If the condition according to equation (7) is true, a processing stage 407 is entered constituting the scrambled bitstream Sb according to:

$$Sb \Leftarrow (Sb \oplus \delta_n) \quad (8).$$

In a subsequent step 408, it is checked whether the loop index n has reached the frame length $F_{len}$. If this is true it is branched to a step 409 sending the shaped frame comprising the scrambled bitstream Sb. If this is not true, the loop index n is incremented (n=n+1) and it is branched to processing stage 405.

If either equation (6) or equation (7) is false, it is branched to step 408.

FIG. 5 is a more detailed version of the binary precoding scheme according to FIG. 4.

Preferably, no multiplication needs to be performed. The most complex operation may be the QAM mapping according to equation (2), which can be implemented via iteration and table lookup.

The precoding approach can be used to approximate fairly arbitrary waveforms by replacing the amplitude criterion in equation (2) with an alternative criterion:

$$|Q_{opt}-Q(Sb+\delta_n)| < |Q_{opt}-Q(Sb)| \quad (9).$$

wherein $Q_{opt}$ denotes an (substantially) arbitrary complex number. An example may be a downstream precoding in a multiuser environment, wherein $Q_{opt}$ is selected in order to reduce or minimize crosstalk effects on (all) other lines.

Automatic Gain Control (AGC):

Another issue relates to an (undesired) adaptation of the automatic gain control (AGC) at the CPE. AGC is in particular relevant for an analog frontend of any receiver in digital communications. AGC in particular comprises a mixed-signal adaptation based on a continuous registration of a received signal thereby adjusting the analog receiver gain. This can advantageously be utilized to allow for an adaptation to a varying signal attenuation (depending on, e.g., loop conditions as loop length, copper diameter as well as on dielectric parameters).

If cross-layer modulation is applied, a legacy VDSL2 CPE may undesirably adapt to the lower transmit power: Hence, if the CO returns to higher transmit power this will result in a detrimentally high clipping rate at an A/D-conversion stage.

This issue can be resolved by utilizing a time duration of the power measurement thereby sending high power frames at a (more or less) regular time interval. Such high power frames may be conveyed in particular by the CPE.

Further Advantages:

The approach provided in particular suggests a novel binary precoding procedure enabling cross-layer modulation that can be supported by current transceiver technology.

The advantages of CLM compared to legacy DSL-technology can be summarized as follows:

(a) By lowering the average transmit power without handshake crosstalk can be reduced without any necessity for a firmware/hardware upgrade at the CPE side.

(b) By achieving higher instantaneous transmit power (without offending standardized PSD masks) CLM achieves a significant gain in reach.

(c) By providing a higher downstream peak date rate, CLM enables an approach for retransmission via the physical layer to efficiently reduce impulse noise (rather than adding redundancy for classical forward error correction schemes such as Reed-Solomon coding). Moreover, by temporally pooling the data rate (in a quasi burst mode fashion) the impact of impulse noise can be statistically reduced.

(d) CLM may utilize Ethernet aggregation technology [IEEE8023], but it can also be used for legacy ATM equipment.

| List of Abbreviations: | |
| --- | --- |
| A/D | Analog to Digital |
| AGC | Adaptive Gain Control |
| CDMA | Code-Division Multiple Access |
| CLM | Cross-Layer Modulation |
| CO | Central Office |
| CPE | Customer Premises Equipment |
| DMT | Discrete Multi-Tone |
| DSL | Digital Subscriber Line |
| DSLAM | Digital Subscriber Line Access Module |
| DSM | Dynamic Spectrum Management |
| FDMA | Frequency-division Multiple Access |
| FFT | Fast-Fourier Transformation |
| FTTC | Fiber-To-The-Curb |
| IFFT | Inverse Fast-Fourier Transformation |
| NEXT | Near-End cross talk |
| PRNG | Pseudo-Random Number Generator |
| PSD | Power Spectrum Density |
| QAM | Quadrature Amplitude Modulation |
| SIR | Signal-to-Interference Ratio |
| SNR | Signal-to-Noise Ratio |
| TDMA | Time-division Multiple Access |
| XOR | Exclusive OR |

The invention claimed is:

1. A method for data processing via a digital subscriber line, the method which comprises:
   (a) manipulating at least one bit of the data;
   (b) checking whether or not the manipulation is admissible by checking with a descrambler whether or not the manipulation of step (a) leads to bit errors regarding payload data and/or necessary overhead data; and
   (c) if the manipulation is admissible, transmitting the manipulated data.

2. The method according to claim 1, which comprises repeatedly processing steps (a) and (b) for a data frame.

3. The method according to claim 1, which comprises repeatedly processing steps (a) and (b) for a DMT frame.

4. The method according to claim 1, which further comprises, following step (a), checking whether the manipulation leads to a reduced transmission power.

5. The method according to claim 1, which further comprises manipulating at least one bit of the data by flipping a value of at least one bit.

6. The method according to claim 1, wherein step comprises checking with a descrambler whether or not the manipulation of step leads to bit errors regarding payload data and/or necessary overhead data.

7. The method according to claim 1, wherein the descrambler comprises a reduced number of taps compared to a scrambler.

8. A method for data processing via a digital subscriber line, the method which comprises:
   (a) manipulating at least one bit of the data;
   (b) checking whether or not the manipulation is admissible;
   (c) if the manipulation is admissible, transmitting the manipulated data; and
   (d) not executing the manipulation in a step and branching to step (a).

9. The method according to claim 1, which comprises, prior to step (a), providing the data to be processed with a scrambler.

10. The method according to claim 9, which comprises applying a bit mask at an input of the scrambler.

11. A method for data processing via a digital subscriber line, the method which comprises:
   providing the data to be processed with a scrambler having an input at which a bit mask is applied;
   subsequently manipulating at least one bit of the data;
   checking whether or not the manipulation is admissible by checking whether the manipulated at least one bit of data does not fall into the bit mask; and
   if the manipulation is admissible, transmitting the manipulated data.

12. The method according to claim 1, which comprises transmitting manipulated data in upstream direction and/or in downstream direction.

13. The method according to claim 1, provided in or associated with a transmitting stage in a central office and/or a digital subscriber line access multiplexer and/or a customer premises equipment.

14. A method for data processing via a digital subscriber line, the method which comprises:
   manipulating at least one bit of the data;
   checking whether or not the manipulation is admissible;
   if the manipulation is admissible, transmitting the manipulated data;
   conveying at least one adaptation signal from a transmitter to a receiver; and
   adjusting a gain of the receiver based on the at least one adaptation signal such that subsequent user data are received substantially without error.

15. The method according to claim 14, which comprises adjusting a gain control of the receiver based on the at least one adaptation signal so that subsequent user data are received substantially without clipping.

16. The method according to claim 14, wherein the at least one adaptation signal comprises intermittent signals in a low power mode and/or intermittent signals in a high power mode.

17. A device for data processing via a digital subscriber line, the device comprising:
   at least one programmable unit selected from the group consisting of a processor unit, a hard-wired circuit, and a logic device configured to execute thereon the following method:
   (a) manipulating at least one bit of the data;
   (b) checking whether or not the manipulation is admissible by checking with a descrambler whether or not the manipulation of step (a) leads to bit errors regarding payload data and/or necessary overhead data; and (c) if the manipulation is admissible, transmitting the manipulated data.

18. The device according to claim 17, wherein the device is a communication device.

19. The device according to claim 18, wherein the communication device is, or is associated with, a central office, a digital subscriber line access multiplexer, or a customer premises equipment.

20. A communication system, comprising the device according to claim 17.

21. The method according to claim 1, which comprises not executing the manipulation in a step (d) and branching to step (a).

22. The method according to claim 1, wherein the step of checking whether or not the manipulation is admissible comprises checking whether the manipulated at least one bit of data does not fall into the bit mask.

23. The method according to claim 1, which comprises:
conveying at least one adaptation signal from a transmitter to a receiver;
adjusting a gain of the receiver based on the at least one adaptation signal such that subsequent user data are received substantially without error.

* * * * *